(12) United States Patent
Wintrich

(10) Patent No.: US 7,520,744 B2
(45) Date of Patent: Apr. 21, 2009

(54) MONITORING DEVICE WITH SCRAPER UNIT

(75) Inventor: Franz Wintrich, Essen (DE)

(73) Assignee: Powtec Intelligent Technologies GmbH, Essen (DE)

( * ) Notice: Subject to any disclaimer, the term of this patent is extended or adjusted under 35 U.S.C. 154(b) by 667 days.

(21) Appl. No.: 11/157,430

(22) Filed: Jun. 21, 2005

(65) Prior Publication Data
US 2006/0024628 A1 Feb. 2, 2006

(30) Foreign Application Priority Data
Jul. 27, 2004 (EP) ................................ 04017720

(51) Int. Cl.
*F23D 14/50* (2006.01)
(52) U.S. Cl. ............................ 431/122; 431/76; 431/13
(58) Field of Classification Search ................ 431/122, 431/76, 13; 110/193, 182.5; 348/83
See application file for complete search history.

(56) References Cited

U.S. PATENT DOCUMENTS

| 4,690,634 A | 9/1987 | Herngren et al. |
| 4,840,474 A | 6/1989 | Heft et al. |
| 4,981,088 A * | 1/1991 | Burris ......................... 110/193 |
| 6,164,956 A * | 12/2000 | Payne et al. .................... 431/3 |

FOREIGN PATENT DOCUMENTS

| EP | 0 716 266 B1 | 6/1996 |
| EP | 0 845 636 A2 | 6/1998 |
| FR | 1270647 | 9/1961 |
| JP | 58064425 | 4/1983 |
| WO | WO 03/025488 | 3/2003 |

* cited by examiner

*Primary Examiner*—Alfred Basichas
(74) *Attorney, Agent, or Firm*—Womble Carlyle Sandridge & Rice, PLLC

(57) ABSTRACT

In a monitoring device (11) in the wall (3) of a furnace (1), particularly for capturing the image of an incineration process in the furnace (1), having an inner end (I), an outer end (E), at least one housing (13, 17), and an monitoring element (25) arranged inside the housing (13, 17), extending at least between the inner end (I) and the outer end (E), the monitoring device (11) is provided with a scraper unit (31) that keeps the inner end (I) of the monitoring element (25) free from deposits occurring on the wall (3).

21 Claims, 2 Drawing Sheets

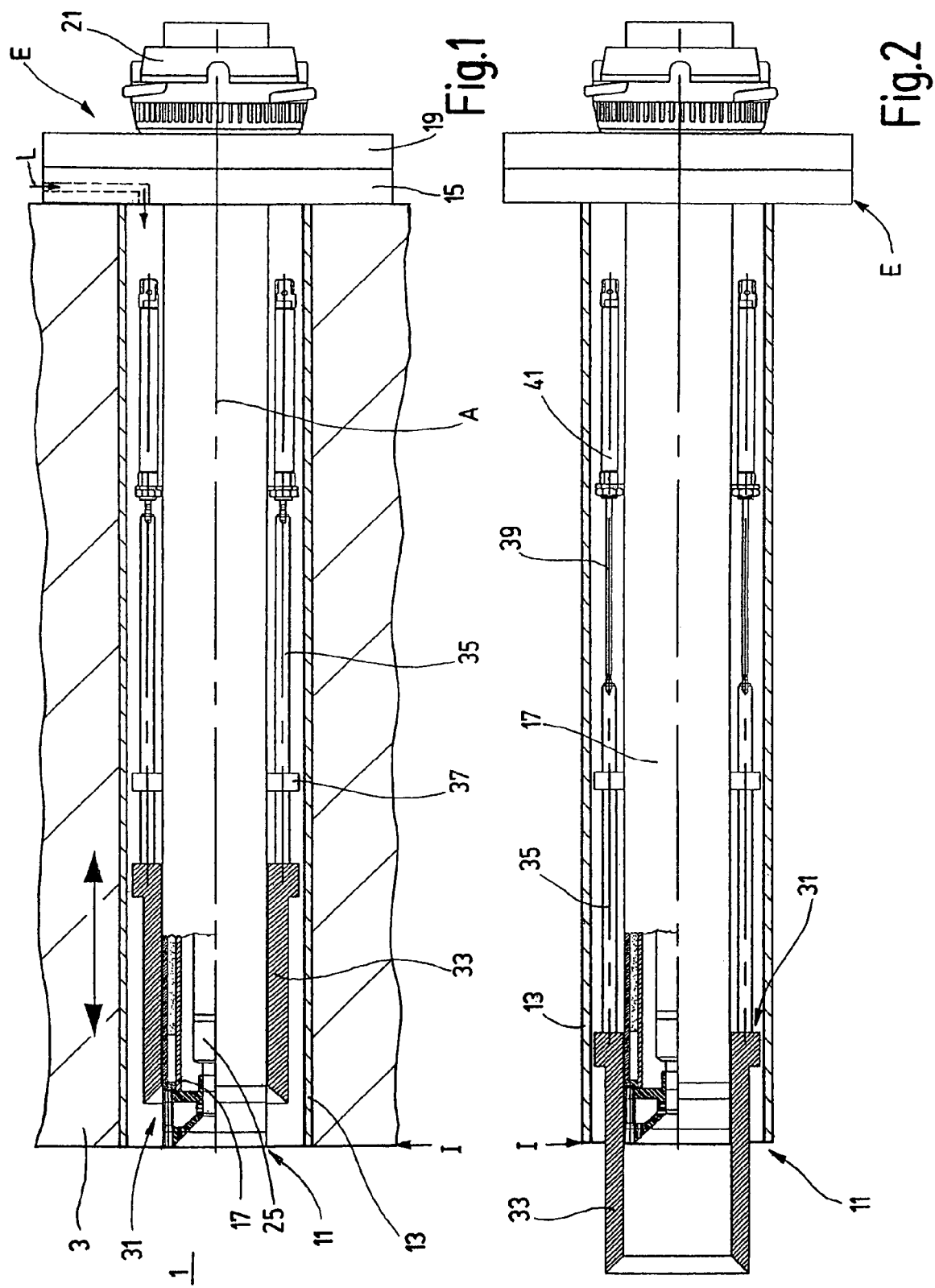

MONITORING DEVICE WITH SCRAPER UNIT

BACKGROUND OF THE INVENTION

The present invention relates to a monitoring device in the wall of a furnace, particularly for capturing the image of an incineration process in the furnace, with the monitoring device having an inner end, an outer end, at least one housing, and a monitoring element arranged inside the housing, with the monitoring element extending between the inner end and the outer end. In a well-known monitoring device of the above-described type, compressed air is used to clean the inner end of deposits. If this does not succeed, then either manual cleaning must take place, which requires turning off the furnace, or the regulation of the incineration process must get along with less information or if faults remain undetected wrong information. In both cases this leads to additional costs.

BRIEF SUMMARY OF SOME ASPECTS OF THE INVENTION

One aspect of the present invention is the provision of improvements to a monitoring device for use in a wall of a furnace, particularly a monitoring device for capturing the image of an incineration process in the furnace. Deposits can accumulate on the surface of the wall that faces the furnace's interior. In accordance with one aspect of the present invention, the monitoring device includes: opposite inner and outer ends, with the inner end being for facing toward the furnace's interior; at least one housing; a monitoring element positioned in the housing and extending at least partially, or even completely, between the inner end and the outer end; and a scraper unit for removing the deposits that accumulate proximate the monitoring element at the inner end.

Because the monitoring device is provided with a scraper unit which keeps the inner end of the monitoring element free from deposits formed on the wall, the vision of the monitoring element on the inside of the furnace can be automatically kept clear. This increases the efficiency of the furnace and reduces operating costs. The terms monitoring device and monitoring element are not limited to the optical range. Rather, they should also be understood as devices and elements for other measuring procedures, including automatic flame detectors and resistance elements.

The scraper unit preferably includes a scraper head that is arranged between the internal end and the external end when in the initial position, so that its functionality is protected by the housing. When the scraper unit is activated, the scraper head is moved by means of a drive along the housing, in order to clean the monitoring element. For this, the scraper head is preferably at least partially extendable beyond the internal end, in order to remove the deposits mechanically.

The housing provided for a compact type of construction with simultaneous integration of the scraper unit preferably consists of a first housing inside which a second housing is arranged at a distance, the monitoring element preferably being firmly attached in the second housing and the scraper head being movably installed between the first housing and the second housing, in particular being supported on the second housing. It can be alternatively or additionally supported on the first housing. Simple geometrical conditions and a simple mounting option in the wall by drilling result from radial symmetry, with the monitoring element, the first housing, the second housing and the scraper head being arranged preferably coaxially to a common axis. The drive, which is not limited to a specific drive system, can act directly on the scraper head. Preferably, however, the drive is connected to extension rods that can be attached to the scraper head for extending it in order to save material.

The housing preferably leads compressed air to the internal end, on the one hand in order to rinse and to cool the monitoring device, and on the other hand to cool down the deposits, so that they are not flexible and can be broken off.

Preferably, activation of the scraper unit takes place on a regular (e.g., periodic) basis, and, in cases when the image processing downstream from the monitoring element detects a darkening and/or clouding at the internal end, an extraordinary activation of the scraper unit takes place additionally, i.e. in either case automatically. This does not exclude manual cleaning. In addition, the information about the activation of the scraper unit can be included into an automatic control loop.

The monitoring device according to the invention with a scraper unit is preferably used in a furnace of an incineration plant, in which particularly strong deposits of ash occur on the wall; however, its purpose is not limited to this.

Other aspects and advantages of the present invention will become apparent from the following.

BRIEF DESCRIPTION OF THE DRAWINGS

The invention is explained in greater detail below with reference to an exemplary embodiment which is illustrated in the drawings, in which:

FIG. 1 is a partial section view of the exemplary embodiment with the scraper head retracted, and the scraper head's mobility being indicated by a double arrow, FIG. 2 is a representation like that of FIG. 1, except that the scraper head is extended and the wall of the furnace is not shown.

DETAILED DESCRIPTION OF EXEMPLARY EMBODIMENT

Figure 3:
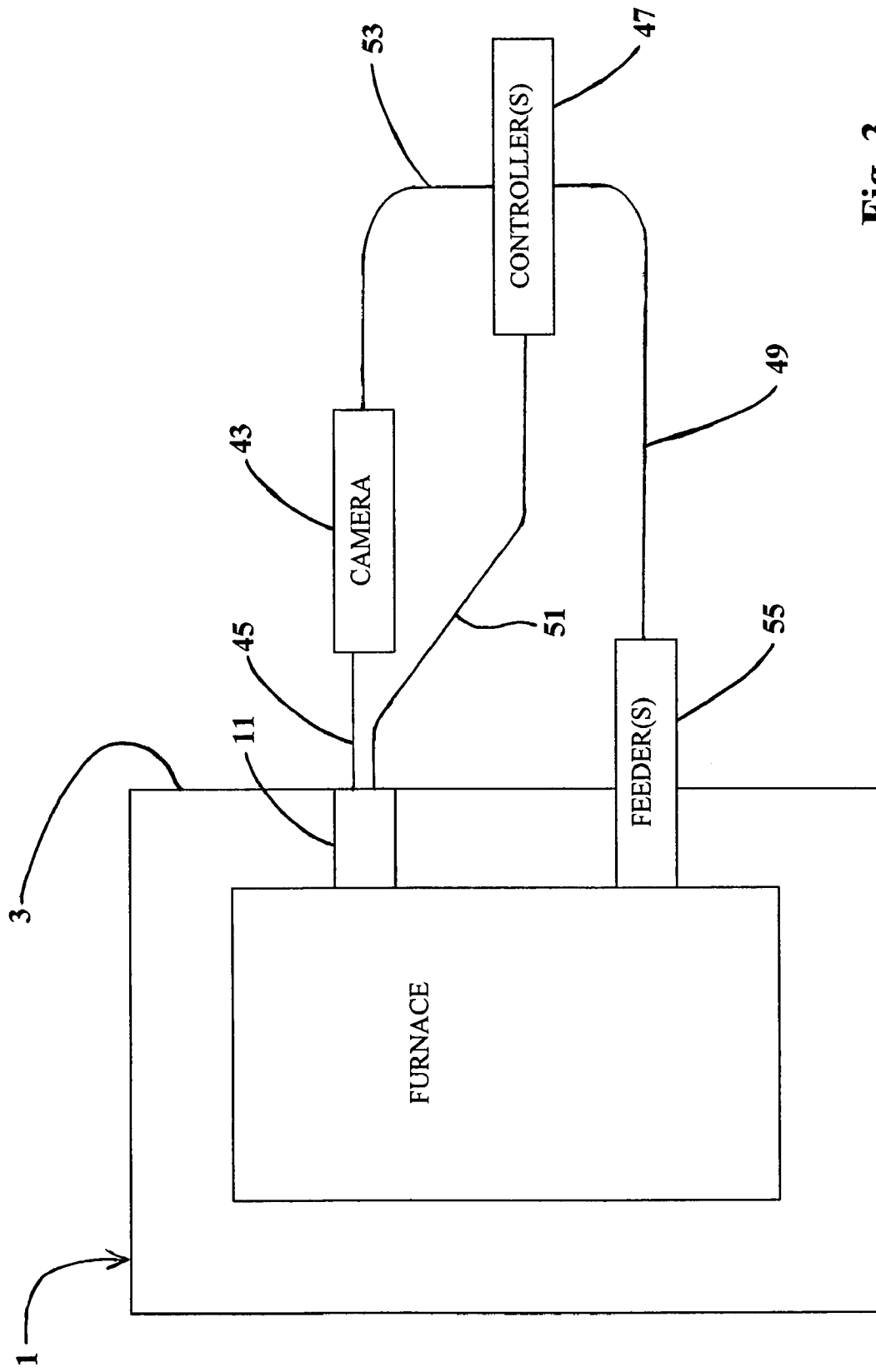
FIG. 3 is a block diagram that schematically illustrates some of the features of the exemplary embodiment.

A furnace 1 of a hazardous waste incineration plant has several openings on its wall 3, and each of the openings respectively contain a monitoring device 11. The monitoring device 11 has an internal end I facing toward the inside of the furnace 1, and an external end E facing away from the inside of the furnace. The monitoring device 11 includes a hollow, circle-cylindrical first housing 13, which defines an axis A by its geometry, and which is firmly (and tightly) connected to the wall 3. The axis A runs at least approximately perpendicularly to the wall 3, and horizontally. A radially projecting first flange 15 is formed onto the first housing 13 at the outer end E.

The monitoring device 11 further includes a cylindrical second housing 17 of smaller diameter that is coaxial with the first housing 13 and arranged therein at a radial distance from the wall of the first housing 13. The second housing 17 has a hollow wall. At the inner end I, the second housing 17 is flush with the first housing 13, whereas at the external end E, there is first a radially extending second flange 19 followed, in the axial direction, by a coupling 21. The second flange 19 is fitted closely to the first flange 15 and is fastened to it for example by a tie-clip connection of the coupling 21.

Inside the second housing 17, the monitoring device 11 includes a substantially radially symmetrical monitoring element 25 of smaller diameter that is coaxial to the second housing. The monitoring element 25 can be an optical device known as a borescope that is for providing a view into the interior of the furnace 1. The monitoring element 25 is arranged at a radial distance from the wall of the second housing 17 and is firmly attached at both ends of the second housing 17 by mounting rings or the like. The monitoring element 25 can be connected to a camera arrangement, which is arranged at a distance from the wall 3 of the furnace 1, either directly or by means of a light conductor. Depending upon the application, various infrared and/or light-sensitive cameras with high space-, time- or frequency resolution or simple diodes are provided in the camera arrangement, for which the monitoring element 25 provides the optical access to the inside of the furnace 1. The camera arrangement serves to capture the images of the incineration process taking place in the furnace 1. In this regard, the term "optical" also relates to radiation beyond both sides the visible range.

For flushing, i.e. for preventing the monitoring element 25, the second housing 17 and the inside of the first housing 13 from getting dirty, and also for cooling these parts of the monitoring device 11, compressed air L is constantly introduced into the monitoring device 11 through a radial drilling in the first flange 15. This compressed air L is led to the inner end I through the gap between second housing 17 and first housing 13 and through the hollow wall of the second housing 17. The difference in pressure between the compressed air L and the interior of the furnace 1 prevents dirt (e.g., ash), which originates inside the furnace, from entering the monitoring device 11.

The monitoring device 11 additionally has a scraper unit 31 which prevents the inner end I of the monitoring device 11 from getting clogged by settling ash due to caking or from losing the view of the inside of the furnace 1 for any other mechanical reason. For this, the scraper unit 31 comprises a sleeve-like scraper head 33. The scraper head 33 is moveably arranged in the gap between the second housing 17 and the first housing 13, for sliding axially on the second housing 17 parallel to the axis A. The scraper unit 31 furthermore comprises four extension rods 35 that serve as an axial extension of the scraper head 33. The extension rods 35 are attached, in particular screwed, to the front side of the scraper head 33 that is facing toward the outer end E. The extension rods 35 are guided in supports 37 connected to the second housing 17. In the exemplary embodiment, the extension rods 35 are coupled to piston rods 39 whose ends, shaped as pistons and facing away from the extension rods 35, move in cylinders 41 and can be pneumatically activated. Different drives may also be considered, such as an electric motor or a hydraulic drive. If necessary, the drives can be provided with reset springs.

Ash is produced in the furnace 1 during the incineration process. The ash settles on the wall 3 of the furnace 1 and, being soft, runs down due to the force of gravity. It can thus happen that such an ash deposit running down reaches the inner end I of the monitoring device 11. Then, the compressed air L begins to cool the ash. When the scraper unit 31 is in the initial position, the scraper head 33 is arranged inside the first housing 13, i.e. at a distance from the inner end I of the monitoring device 11. The scraper unit 31 is normally clock operated, i.e. regularly activated, for instance, every 10seconds or each minute, with the activated extension rods 35 extending the scraper head 33 until the latter reaches beyond the inner end I, and then retracting it again until it reaches the initial position. Any ash deposit that reaches the extending range of the scraper head 33 is mechanically broken off by this regular activation of the scraper unit 31.

The image of the inside of the furnace 1 taken by the camera arrangement of the monitoring device 11 is subjected to an image processing by an electronic analysis and control device (e.g., controller(s) which include one or more computer processors), which takes actions for controlling the incineration process in the furnace 1 depending on the control targets, if necessary, i.e. controlling the feeding of the furnace 1. The above-mentioned control device, or another control device (e.g., which includes one or more computer processors) associated therewith, can control operation of the scraper unit 31, by providing regular activation of the scraper unit 31 and extraordinary activation of the scraper unit. For example, the regular activation can be the above-described regular activation/timed activation of the scraper unit. An extraordinary activation of the scraper unit 31 is like a timed activation, except that the triggering of the extraordinary activation is based upon a different criteria. If a darkening from the (upper) edge is detected from the image obtained by the monitoring element 25, operation of the scraper unit 31 is triggered, i.e. the growing ash deposit is cleared by an extraordinary activation of the scraper unit 31. If determined necessary by the control device(s), the intervals for regular activation of the scraper unit 31 can then be shortened. If there is no improvement, an alarm is triggered by the control device(s) in order to request manual cleaning, particularly if repeated extraordinary activation of the scraper unit 31 remains fruitless. The information about the frequency of the activation of the scraper unit 31 is also preferably used, by the control device(s), for controlling the incineration process.

As an example, FIG. 3 schematically illustrates the monitoring device 11 connected to the camera arrangement 43 by way of the light conductor 45, and the controller(s) 47 respectively communicating by way of communication paths 49, 51, 53 with (i) the feeder(s) 55 for controlling the feeding of the furnace 1, (ii) the monitoring device 11 for controlling activation of the scraper unit 31, and (iii) the camera arrangement 43 for receiving the image information.

It will be understood by those skilled in the art that while the present invention has been discussed above with reference to an exemplary embodiment, various additions, modifications and changes can be made thereto without departing from the spirit and scope of the invention as set forth in the following claims.

What is claimed is:

1. A monitoring device for being mounted in a wall of a furnace of a type in which deposits may accumulate on the wall's surface that faces the furnace's interior, the monitoring device comprising:

opposite inner and outer ends, wherein the inner end is for facing toward the furnace's interior;

at least one housing;

a monitoring element positioned in the housing and extending at least partially between the inner end and the outer end;

a scraper unit including a scraper head mounted for moving along the housing between a retracted position and an extended position, and at least one drive for reciprocating the scraper head along the housing between the retracted and extended positions; and the scraper unit being adapted so that the scraper head is for contacting, and thereby removing, the deposits that accumulate proximate the monitoring element at the inner end, and so that the contacting occurs in response to the scraper head being reciprocated along the housing between the retracted and extended positions.

2. The monitoring device according to claim 1, wherein the the retracted position is an initial position in which the scraper head is retracted from the inner end, and positioned at least partially between the inner end and the outer end.

3. The monitoring device according to claim 2, wherein the scraper head extends outward, at least partially beyond the inner end while the scraper head is in the extended position.

4. The monitoring device according to claim 3, wherein:
the housing is a first housing; and
the monitoring device further includes a second housing that is positioned inside the first housing and at a distance from the first housing.

5. The monitoring device according to claim 4, wherein the monitoring element is fixed in the second housing and the scraper head is guided movably between the first housing and the second housing.

6. The monitoring device according to claim 5, wherein the monitoring element, the first housing, the second housing and the scraper head are coaxially arranged around a common axis.

7. The monitoring device according to claim 2, wherein:
the housing is a first housing; and
the monitoring device further includes a second housing that is positioned inside the first housing and at a distance from the first housing.

8. The monitoring device according to claim 7, wherein the monitoring element is fixed in the second housing and the scraper head is guided movably between the first housing and the second housing.

9. The monitoring device according to claim 8, wherein the monitoring element, the first housing, the second housing and the scraper head are coaxially arranged around a common axis.

10. The monitoring device according to claim 2, wherein extension rods are attached to the scraper head, and the extension rods are engaged by the at least one drive.

11. The monitoring device according to claim 1, wherein the housing includes at least one passageway for providing compressed air to the inner end, and the monitoring device is adapted so that the compressed air is provided to the inner end in a manner that cools the deposits that accumulate proximate the monitoring element at the inner end, so that the deposits that accumulate proximate the monitoring element at the inner end are rigidified for being broken off by the scraper head in response to the contacting that occurs between the scraper head and the deposits that accumulate proximate the monitoring element at the inner end.

12. The monitoring device according to claim 11, wherein the monitoring device is adapted so that the compressed air is constantly introduced into the monitoring device.

13. The monitoring device according to claim 1, further comprising one or more controllers operatively associated with the monitoring element for:
causing regular activation of the scraper unit, wherein the regular activation of the scraper unit comprises the at least one drive reciprocating the scraper head along the housing between the retracted and extended positions,
processing images that are from the monitoring element and that are at least indicative of any darkening and/or clouding at the inner end,
determining whether any darkening and/or clouding of the processed images reaches a predetermined level, and
causing an additional activation of the scraper unit in response to any darkening and/or clouding of the processed images reaching the predetermined level, wherein the regular activation of the scraper unit comprises the at least one drive reciprocating the scraper head along the housing between the retracted and extended positions.

14. The monitoring device of claim 1, in combination with the wall and the furnace, wherein the monitoring device is mounted in the wall, and the monitoring element is at least for providing information about a process within the furnace's interior.

15. The combination of claim 14, wherein:
the furnace is part of an incineration plant, and
the information is about an incineration process within the furnace's interior.

16. The monitoring device of claim 1, wherein the scraper unit encircles the monitoring element.

17. A monitoring device for being mounted in a wall of a furnace of a type in which deposits may accumulate on the wall's surface that faces the furnace's interior, the monitoring device comprising:
opposite inner and outer ends, wherein the inner end is for facing toward the furnace's interior;
at least one housing;
a monitoring element positioned in the housing and extending at least partially between the inner end and the outer end; and
a scraper unit for removing the deposits that accumulate proximate the monitoring element at the inner end, wherein the scraper unit includes
a scraper head mounted for moving along the housing between positions,
at least one drive for moving the scraper head along the housing between said positions, and
extension rods that are attached to the scraper head, wherein
the extension rods are engaged by the at least one drive,
one of said positions is an initial position in which the scraper head is retracted from the inner end, and positioned at least partially between the inner end and the outer end, and
another of said positions is an extended position in which the scraper head extends outward, at least partially beyond the inner end.

18. The monitoring device according to claim 17, wherein the housing includes at least one passageway for providing compressed air to the inner end.

19. The monitoring device according to claim 17, further comprising one or more controllers operatively associated with the monitoring element for:
causing regular activation of the scraper unit,
processing images that are from the monitoring element and that are at least indicative of any darkening and/or clouding at the inner end,
determining whether any darkening and/or clouding of the processed images reaches a predetermined level, and
causing an additional activation of the scraper unit in response to any darkening and/or clouding of the processed images reaching the predetermined level.

20. The monitoring device according to claim 17, wherein:
the housing is a first housing;
the monitoring device further includes a second housing that is positioned inside the first housing and at a distance from the first housing;
the monitoring element is fixed in the second housing; and
the scraper head is guided movably between the first housing and the second housing.

21. The monitoring device of claim 17, wherein the scraper unit extends at least partially around the monitoring element.

* * * * *

UNITED STATES PATENT AND TRADEMARK OFFICE
CERTIFICATE OF CORRECTION

| | |
|---|---|
| PATENT NO. | : 7,520,744 B2 |
| APPLICATION NO. | : 11/157430 |
| DATED | : April 21, 2009 |
| INVENTOR(S) | : Franz Wintrich |

It is certified that error appears in the above-identified patent and that said Letters Patent is hereby corrected as shown below:

Title Page, Item (73) Assignee

Change "Powtec" to --Powitec--.

Signed and Sealed this

Twenty-eighth Day of July, 2009

JOHN DOLL
*Acting Director of the United States Patent and Trademark Office*